United States Patent [19]

Weil et al.

[11] 4,336,125

[45] Jun. 22, 1982

[54] PRODUCTION OF SYNTHETIC HYDROCARBON FUELS FROM PEAT

[75] Inventors: Sanford A. Weil, Chicago; Dharamvir Punwani, Bolingbrook; William W. Bodle, Deerfield, all of Ill.

[73] Assignee: Institute of Gas Technology, Chicago, Ill.

[21] Appl. No.: 241,386

[22] Filed: Mar. 6, 1981

Related U.S. Application Data

[63] Continuation-in-part of Ser. No. 59,131, Jul. 20, 1979, Pat. No. 4,263,125.

[51] Int. Cl.³ .................. C10G 1/00; C10B 47/00; C10B 51/00; C10B 47/24
[52] U.S. Cl. ..................... 208/8 R; 201/16; 201/25; 201/31; 201/36; 518/703; 585/322
[58] Field of Search ............ 208/8 R; 201/25, 16, 201/31, 36; 518/703

[56] References Cited

U.S. PATENT DOCUMENTS

| | | | |
|---|---|---|---|
| 936,049 | 10/1909 | Shepherd | 201/25 X |
| 2,560,767 | 7/1951 | Huff | 201/25 X |
| 2,933,822 | 4/1960 | Nathan | 208/8 R |
| 2,989,442 | 6/1961 | Dorsey | 202/87 X |
| 3,843,339 | 10/1974 | Saito | 48/197 R |
| 3,993,457 | 11/1976 | Cahn et al. | 48/197 R |
| 4,064,018 | 12/1977 | Choi | 201/21 X |
| 4,142,867 | 3/1979 | Kiener | 202/87 X |
| 4,211,632 | 7/1980 | Chukhanov et al. | 208/8 R |
| 4,213,826 | 7/1980 | Eddinger et al. | 208/8 R X |
| 4,218,287 | 8/1980 | Albright et al. | 208/8 R X |

FOREIGN PATENT DOCUMENTS 2103026  8/1971  Fed. Rep. of Germany ........ 201/31

*Primary Examiner*—Delbert E. Gantz
*Assistant Examiner*—William G. Wright
*Attorney, Agent, or Firm*—Thomas W. Speckman

[57] ABSTRACT

A process and apparatus for production of synthetic hydrocarbon fuels from peat providing wide variation of the composite proportion of liquid-gas output while maintaining high overall carbon conversion to useful fuel. The process and apparatus utilizes three process stages in a single vessel providing functions of drying wet peat, provisions for addition of both wet and dry peat to a hydropyrolysis zone and gasification of the peat char.

40 Claims, 5 Drawing Figures

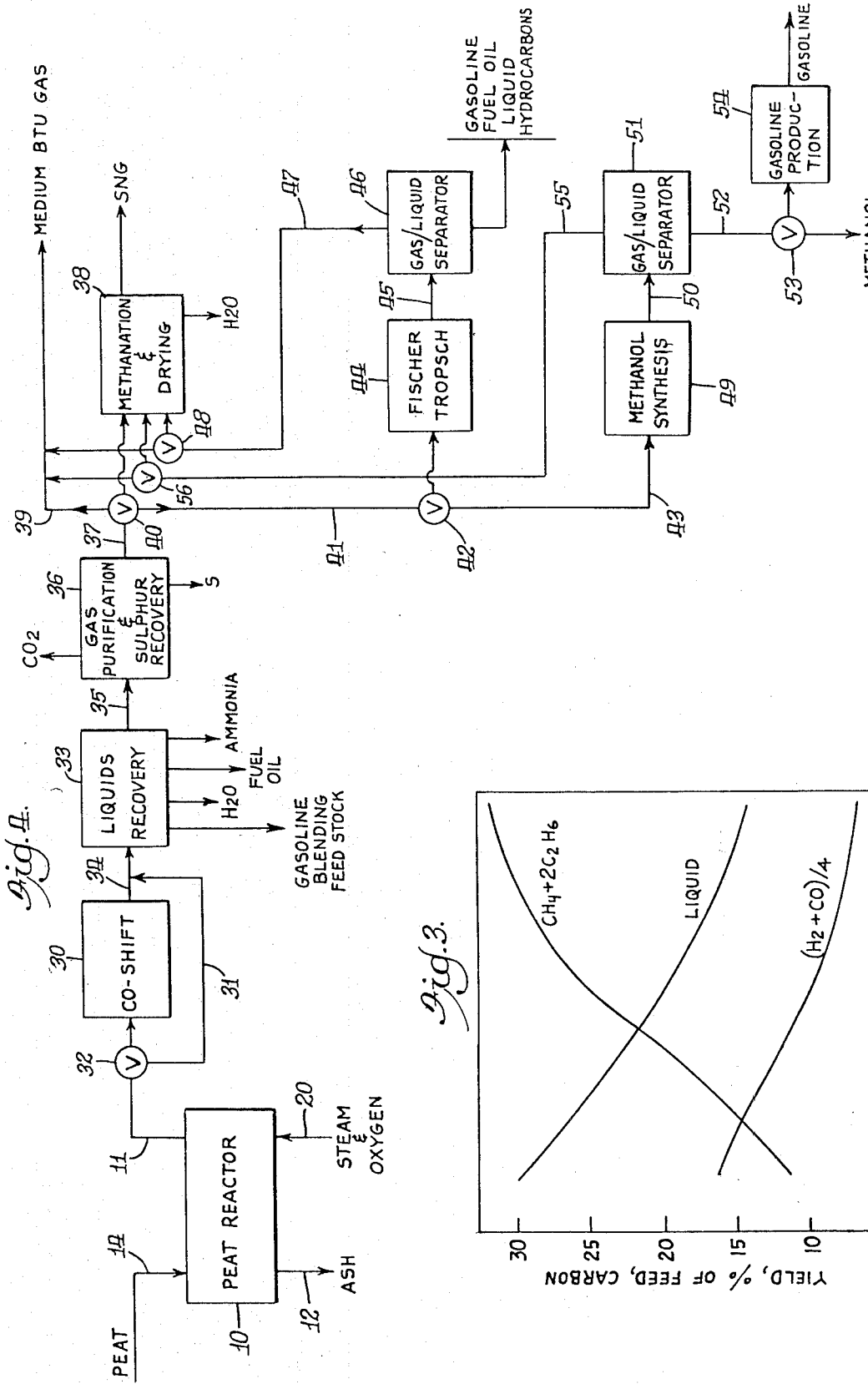

PRODUCTION OF SYNTHETIC HYDROCARBON FUELS FROM PEAT

CROSS REFERENCE TO RELATED APPLICATION

This is a continuation-in-part application of our earlier filed U.S. Patent Application Ser. No. 59,131, filed July 20, 1979, now U.S. Pat. No. 4,263,125.

BACKGROUND OF THE INVENTION

1. Field of the Invention

This invention relates to a process and apparatus for production of synthetic hydrocarbon fuels from peat wherein the relative liquid-gas outputs may be varied to provide greater proportions of liquid or gaseous fuels as desired, while maintaining highly efficient overall carbon conversion to useful fuel.

Peat is considered to be geologically young coal and has been found extensively throughout the world. European countries and Asian countries have for years extensively used peat as a source of fuel and chemicals. The United States is considered to have the second largest peat resource in the world, but has not used peat commercially as a source of energy. The total energy contained in the United States peat resources is estimated to be equivalent to about 240 billion barrels of oil. Thus, peat is the second most abundant fossil fuel, after coal, in the United States. Peat is of even more significance in the United States since in the contiguous 48 states, the peat deposits are generally located in areas with no significant resources of other fossil fuels. The peat deposits in the United States occur generally at the ground surface, with little or no overburden. Therefore, peat harvesting and land reclamation efforts have been very successful. Large scale utilization of peat, therefore, should have a positive effect upon the environment, the socioeconomic system, as well as providing energy resources.

2. Description of the Prior Art

The potential for production of synthetic natural gas (SNG) from peat has been previously recognized. "Peat Gasification for SNG Production", D. V. Punwani and A. M. Rader, presented at Nine Synthetic Pipeline Gas Symposium, Oct. 31–Nov. 2, 1977, Chicago, Illinois; "SNG Production from Peat", D. V. Punwani, W. W. Bodle, A. M. Rader and P. B. Tarman, presented at Miami International Conference on Alternative Energy Sources, Dec. 5–7, 1977, Miami, Florida; "Peat Gasification—An Experimental Study", D. V. Punwani, S. P. Nandi, L. W. Gavin and J. L. Johnson, presented at 85th National Meeting of the American Institute of Chemical Engineers, June 4–8, 1978, Philadelphia, Pennsylvania. The teachings of these papers recognize the desirability for converting peat to SNG in that the fraction of carbon converted during a short residence time gasification is about two and one-half times higher than that converted during lignite gasification and therefore, during conversion of peat to SNG less peat char will have to be gasified than in coal to SNG conversion processes. Further, these results have shown that the maximum carbon conversion to SNG can be achieved at temperatures a few hundred degrees less than required for lignite. Conversion of peat to SNG also requires less methanation than required for lignite since the fraction of carbon converted to hydrocarbon gases (methane, ethane and ethylene) is about four times greater than for lignite. It has also been found that hydrogasification of peat may be achieved at much lower pressures than required in coal gasification. The prior art has considered only maximization of gasification from peat and has not, previous to this invention, considered the overall energy utilization of peat, including the quality and method of production of hydrocarbon liquid fuels and medium Btu gases.

Nathan, U.S. Pat. No. 2,933,822 teaches treatment of carbonaceous solids such as coal, shale, lignite and oil sands in a fluidized bed for production of gas, a tar product and a char product by pretreating under oxidation conditions at 600° to 825° F. and carbonization at 700° to 2400° F. followed by cooling the hot char. Cahn et al, U.S. Pat. No. 3,993,457 teaches gasification of coal or liquid high boiling petroleum residues by contact with injected steam in a fluidized bed at 1000° to 2000° F. to result in crude synthesis gas which may be subjected to a water gas shift conversion. Again, the prior art has not, previous to the present invention, considered the overall energy utilization of peat, including the quality and method of production of hydrocarbon liquid fuels and medium Btu gases.

It is an object of this invention to provide a process and apparatus for increasing the overall energy utilization of peat by increasing or decreasing, as desired, production of hydrocarbon liquid fuels including gasoline and gasoline blending feed stock.

It is another object of this invention to provide a process and apparatus providing higher overall energy efficiencies than obtained with prior peat gasification processes which were only concerned with maximizing production of synthetic natural gas.

BRIEF DESCRIPTION OF THE DRAWINGS

Further objects and features of the invention will become more apparent from a reading of the following description and reference to the figures showing preferred embodiments wherein:

FIG. 3 is a graph showing proportionate distribution of hydrocarbon liquids and gases.

FIG. 4 is a schematic flow diagram for the process of this invention for production of various hydrocarbon fuels.

DESCRIPTION OF THE PREFERRED EMBODIMENTS

Figure 1:
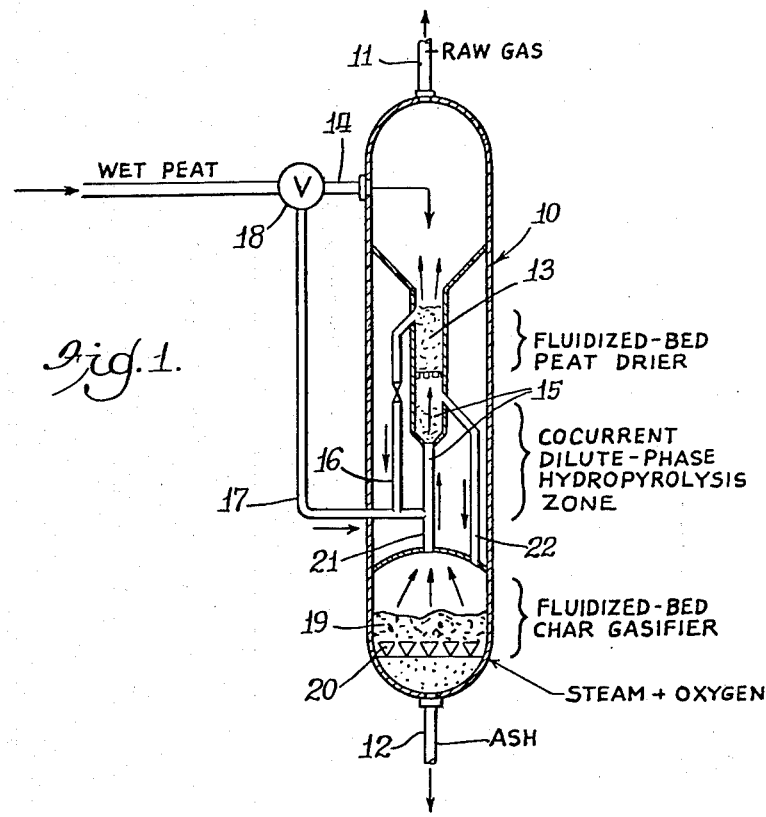
FIG. 1 is a schematic layout of one embodiment of a reactor according to this invention.
Figure 5:
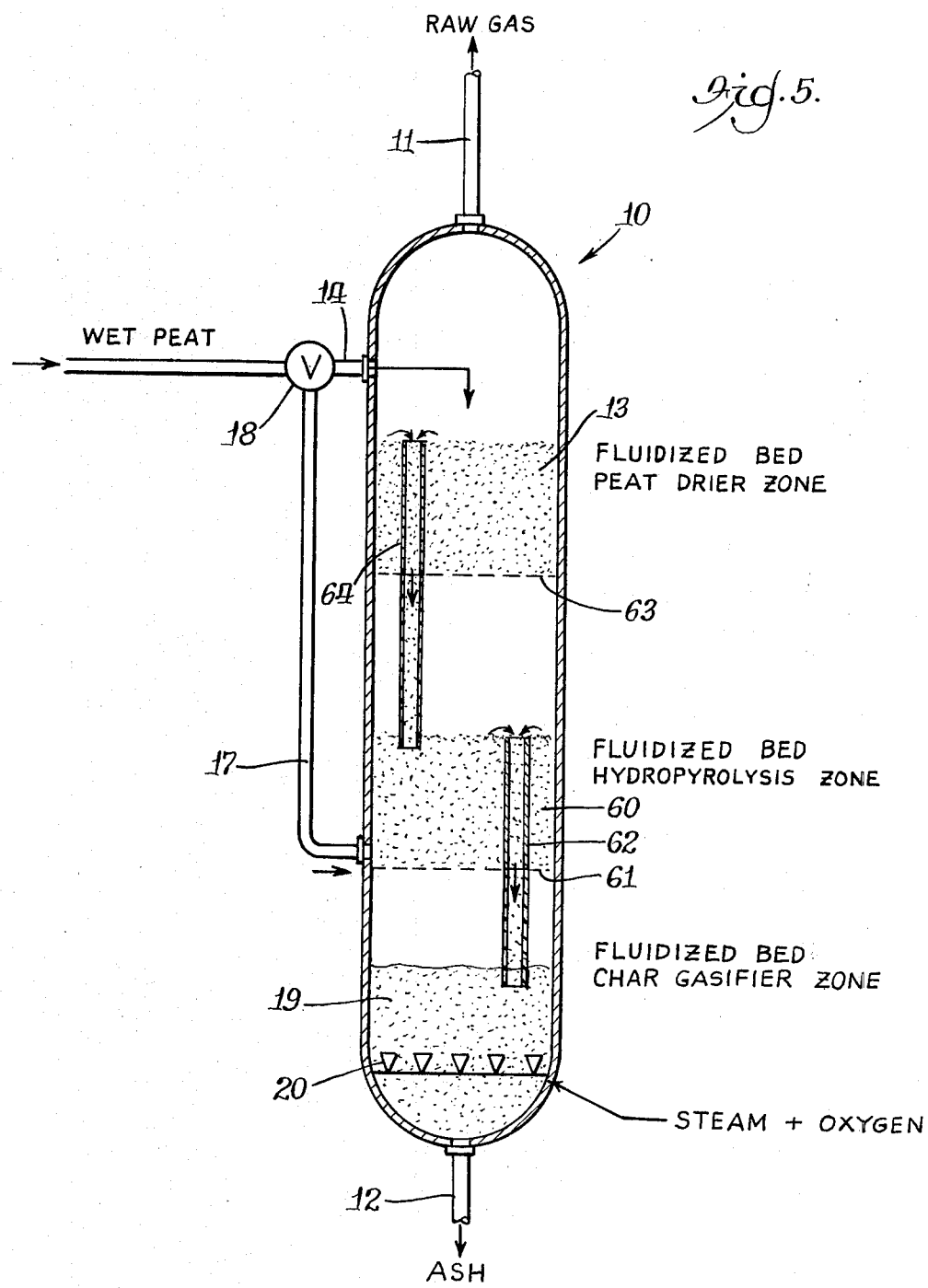
FIG. 5 is a schematic layout of another embodiment of a reactor according to this invention.

FIGS. 1 and 5 show a schematic representation of peat reactor 10 for production of synthetic hydrocarbon composite liquid-gas fuels from peat and having gas outlet means 11 in the upper portion and ash removal means 12 in the lower portion. Fluidized bed peat drier means 13 is located in the upper portion of the reactor chamber and includes suitable fluidized bed support means for support of the peat fluidized bed. Raw, or wet, peat is supplied to fluidized bed peat drier means 13 by peat supply means 14. Although peat supply means 14 is shown as a conduit means, one preferred supply means is introduction of wet peat by a lock hopper, as is well known to the art, to provide introduction of solids to a pressurized reactor. Supply of wet peat by lock hopper avoids the necessity of additional drying in the fluidized peat drier 13 which results from introduction of the peat in a slurry. Further, it is preferred that the peat be provided to fluidized bed peat drier means 13 at a moisture content of 35 weight percent and less. This means that raw peat, which frequently has moisture content of up to 50 weight percent, should be partially dried external to the peat reactor. For highest conversion to hydrocarbon fuels, the peat should be dried in the drier to a moisture content of less than about 10 percent, and preferably less than about 5 percent.

In the embodiment shown in FIG. 1, dried peat from fluidized bed peat drier 13 is passed through conduit means 16 to the lower portion of hydropyrolysis zone 15. A second peat supply means to the lower portion of hydropyrolysis zone 15 may be used when desired as taught further herein and controlled by valve 18 is provided by second peat supply means 17 for introduction of wet peat to increase hydrocarbon liquid production. It is preferred that second peat supply means 17 also be fed by a lock hopper which may be the same as used for supply means 14. By "wet peat" for introduction directly to hydropyrolysis zone 15, we mean peat having a moisture content of about 35 weight percent. Hydropyrolysis zone 15 is operated as a cocurrent dilute phase reaction zone wherein the principal conversion of the peat organic carbon to hydrocarbon liquids and gases takes place.

Peat char is transported from the upper portion of the hydropyrolysis zone 15 by char conduit means 22 to fluidized bed peat char gasifier means 19 in the lower portion of the reactor chamber. The fluidized bed char gasifier means includes suitable support for the fluidized bed with means for passing the peat ash to ash removal means 12. Steam and oxygen is supplied by supply means 20 distributed throughout the lower portion of fluidized bed peat char gasifier means 19 in sufficient quantity to provide desired fluidization of the char bed and desired steam to feed carbon ratio.

As shown in FIG. 1, reactor 10 has conduit means 21 extending from the lower portion to the upper portion of the reactor and in communication with peat char gasifier 19, hydropyrolysis zone 15 and peat drier means 13. The gases pass upwardly in sequence from peat char gasifier 19 through cocurrent hydropyrolysis zone 15 and then through fluidized bed peat drier means 13 and carried from the reactor by gas outlet means 11.

FIG. 5 show a schematic representation of another embodiment of a reactor and process suitable for production of synthetic hydrocarbon fuels from peat according to this invention. The operation of peat reactor 10 shown in FIG. 5 is similar to the operation as described with respect to FIG. 1, except that the cocurrent dilute phase hydropyrolysis zone is replaced by a countercurrent fluidized bed hydropyrolysis zone. The fluidized bed hydropyrolysis zone facilitates utilization of heat released by slower exothermic reactions by the faster endothermic reactions due to more effective mixing of these reaction components. This provides greater process reaction control and permits more effective utilization of peat materials which are oxygenated to a higher degree and other organic carbonaceous materials such as cellulosic materials including biomasses such as wood, wood chips, sawdust, agricultural wastes such as corn stalks and bagasse, fresh cut agricultural crops and municipal and industrial wastes which are principally cellulosic in nature.

Referring to FIG. 5, dried peat from fluidized bed peat drier 13 is passed through conduit means 64 to fluidized bed hydropyrolysis zone 60. Fluidized bed peat drier 13 includes suitable support means 63 for retention of the fluidized bed and permitting throughflow of the fluidizing gases. A second peat supply means to the lower portion of fluidized bed hydropyrolysis zone 60 may be used when desired as taught further herein and controlled by valve 18 is provided by second peat supply means 17 for introduction of wet peat to increase hydrocarbon liquid production. It is preferred that second peat supply means 17 also is fed by a lock hopper which may be the same as used for supply means 14. By "wet peat" for introduction directly to fluidized bed hydropyrolysis zone 60, we mean peat having a moisture content to about 35 weight percent. Hydropyrolysis zone 60 is operated as a countercurrent fluidized bed reaction zone wherein the principal conversion of the peat organic carbon to hydrocarbon liquids and gases takes place. The fluidized bed hydropyrolysis means includes suitable support means 61 for retention of the fluidized bed and permitting throughflow of the fluidizing gases.

Peat char is transported from the upper portion of the fluidized bed hydropyrolysis zone 60 by char conduit means 62 to fluidized bed peat char gasifier means 19 in the lower portion of the reactor chamber. The fluidized bed char gasifier means in FIG. 5 is the same as described with respect to the reactor of FIG. 1.

As shown in FIG. 5, reactor 10 is open for upward gaseous passage from the lower portion to the upper portion of the reactor and in communication with peat char gasifier 19, hydropyrolysis zone 60 and peat drier means 13. The gases pass upwardly in sequence from peat char gasifier 19 through fluidized bed hydropyrolysis means 60 and then through fluidized bed peat drier means 13 and carried from the reactor by gas outlet means 11. Peat passes downwardly in sequence from fluidized bed peat drier means 13 to fluidized bed hydropyrolysis means 60 to fluidized bed char gasifier means 19.

In the process of this invention, for both types of reactors illustrated as suitable, the total pressure in the reactor, that is, in the fluidized bed char zone, hydropyrolysis zone and fluidized bed peat drier is maintained at about 200 to about 600 psia and preferably about 450 to about 550 psia. To carry out the desired hydropyrolysis in the hydropyrolysis zone, the hydrogen partial pressure is maintained at about 60 to about 150 psia and preferably about 80 to about 120 psia, the hydrogen being produced in the fluidized bed char zone.

The process of this invention for production of synthetic hydrocarbon fuels from peat provides great flexibility for overall process thermal efficiencies higher than prior processes directed to the production of synthetic natural gas from peat. It has been found that the hydrocarbon liquid yield is principally dependent upon the temperature of the hydropyrolysis reactor zone and the residence time of the vapor therein. The effect of hydropyrolysis zone temperature on yields of hydrocarbon gases and hydrocarbon liquids and hydrogen plus carbon monoxide for a residence time of 10 seconds in a cocurrent dilute phase hydropyrolysis zone is shown in FIG. 3. The fluidized bed char gasifier was operated at a mean temperature of about 1700° F. and a steam/feed carbon mole ratio of 0.4. The reactor pressure was 515 psia. The peat was pre-dried to about 35 weight percent moisture and the mean temperature of the fluidized bed drier maintained at about 450° F. Shorter residence times would increase liquid production. A reduction of 10% in residence time would have the same effect as a 15° F. reduction in temperature. Suitable gas phase residence times in the hydropyrolysis zone according to this invention are about 2 to about 10 seconds in both the cocurrent dilute phase embodiment and the fluidized bed embodiment. In the cocurrent dilute phase embodiment, the solid phase residence time in the hydropyrolysis zone is approximately the same as the gas phase. In the fluidized bed embodiment, due to the mechanics of operating the fluidized bed, the solid phase residence time in the hydropyrolysis zone may be up to about 10 minutes, preferably about 1 to about 5 minutes. The mean temperature of the hydropyrolysis zone is maintained at about 1000° to about 1400° F. for high liquid hydrocarbon yield.

To obtain high overall process efficiency in the conversion of peat to hydrocarbon fuels, it is important to maintain the mean temperature of the char gasifier zone above about 1700° F. and below the sintering temperature of the char. Temperatures of about 1700° to about 1900° F. are preferred. Char residence times of about 15 to about 30 minutes in the char gasifier zone are suitable. When temperatures in the higher portion of the range are used, higher fluidization velocities may be used to keep the char fluidized bed sinter-free. We have found that the reactivity of the peat char produced by this process and passed directly from the hydropyrolysis zone to the fluidized bed char gasifier zone without cooling to ambient conditions is about twice the reactivity of similarly treated peat char which has been cooled to ambient conditions before gasification. We have obtained conversions of up to 97 percent of the carbon in the char.

Figure 2:
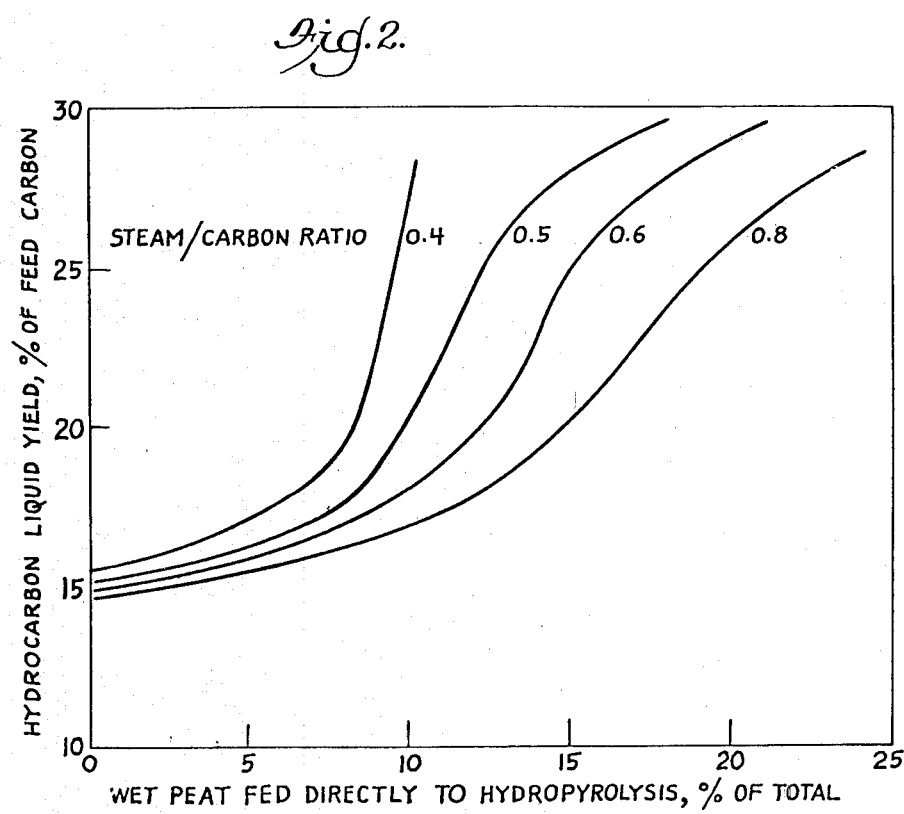
FIG. 2 is a graph showing increase in hydrocarbon liquid due to wet peat addition to the hydropyrolysis zone.

Operating conditions of the hydropyrolysis zone may be controlled in various manners, but such control is extremely limited by the necessity of operating fluidized bed char gasifier 19 at a high temperature to obtain high yield of useful hydrocarbon fuel and the necessity of drying at least a major portion of the feed peat in fluidized bed peat drier 13. We have found that hydrocarbon liquid fuel yield may be successfully increased, while maintaining high efficiency conversion of carbon contained in peat to useful hydrocarbon fuels, by adding about 5 to about 25 weight percent wet peat, based upon total peat, to the bottom of the hydropyrolysis zone to increase liquid hydrocarbon yield suitable for gasoline blending feedstock and fuel oil, the mean temperature of the hydropyrolysis zone being maintained at about 1000° to about 1400° F. It is preferred that about 7 to about 15 weight percent wet peat, based upon total peat, is provided to the bottom of the hydropyrolysis zone which is maintained at a temperature of about 1100° to about 1200° F. to increase hydrocarbon liquid production. FIG. 2, wherein the reactor was operated under substantially the same conditions as set forth with respect to FIG. 3, shows the effect of wet peat addition directly to the hydropyrolysis zone and the effect of varying the steam to feed carbon ratio between 0.4 and 0.8. Thus, liquid hydrocarbon production may be increased by feeding wet peat to the hydropyrolysis zone and lowering the temperature in the char gasifier. Lowering the temperature in the char gasifier significantly, however, lowers the overall process efficiency for carbon conversion to hydrocarbon fuels.

We have found that the hydrocarbon liquids produced according to our process are suitable for use as gasoline blending feedstock and fuel oil, both useful synthetic hydrocarbon fuels. The potential yield of liquid fuels from peat is significantly higher than obtainable from lignite and sub-bituminous coals. The process of this invention provides direct liquid hydrocarbon fuel yields in the order of about 15 to as high as 34 percent of the feed carbon. This compares to the liquid yield from lignite and sub-bituminous coals which can be only about 8 to 10 percent of the feed carbon. Further, the process of production of synthetic hydrocarbon fuels from peat can be conducted at much lower pressures, particularly lower hydrogen partial pressures, than is required for sub-bituminous coals.

Significant flexibility in product distribution and process economics is shown by the flow sheet of FIG. 4. When high Btu (greater than 900 Btu/SCF) gases such as SNG, are not required, medium Btu gases in the order of 250 to 500 Btu may be utilized directly or may be successfully and readily converted to liquid hydrocarbon fuels. Referring to FIG. 4, it is seen that the peat reactor products from the reactor chamber gas outlet means 11, may completely bypass CO-shift, used to adjust the hydrogen to CO ratio for production of SNG, by control valve 32 through bypass conduit 31 directly to liquids recovery means 33, such as a knock-out condenser. The produced hydrocarbon liquids suitable for gasoline blending feedstock and fuel oil may be directly separated. The off gas from liquid recovery means 33 is passed by conduit 35 to gas purification means 36 for removal of $CO_2$ and sulfur by any suitable means known to the art. The purified hydrocarbon gas may then be directly used as indicated by medium Btu gas conduit 39 as medium Btu gas, may be passed by control valve 40 for methanation and drying to produce SNG or may be passed by control valve 40 through conduit 41 to Fischer-Tropsch type synthesis 44 for production of hydrocarbon liquids, including gasoline fuel oil and other liquid hydrocarbons or to methanol synthesis means 49 for production of methanol which may be used as methanol or for production of gasoline by means known to the art. Thus, it is seen that if maximum liquid synthetic hydrocarbon fuels are desired, the medium Btu gases produced according to this process may be used in known processes to produce gasoline, fuel oil, methanol and other liquid hydrocarbons. When medium Btu gases may be utilized as fuels, they may be utilized directly with only $CO_2$ and sulfur removal. When high Btu gases such as SNG are required, the CO-shift may be used to adjust the hydrogen to CO ratio and both the medium Btu gaseous products from gas purification means 36 and gas-liquid separator 46 following Fischer-Tropsch type synthesis means 44 and from gas liquid separator means 51 following methanol synthesis means 49 may be readily methanated and dried to produce high Btu SNG.

For increased production of SNG, the hydropyrolysis zone is operated at about 1400° to about 1600° F., preferably at about 1450° to about 1550° F. with all of the peat being added through the fluidized bed peat drier. At a steam to carbon ratio of about 0.4, char gasifier operated at about 1700° F. and hydropyrolysis zone at about 1500° F., as much as 84 percent of the methane is made directly in the reactor, the remaining 16 percent made by catalytic methanation. The liquids produced under such operating conditions correspond to about 15 percent of the feed carbon of which more than half is suitable gasoline blending feedstock and the remaining liquids are suitable for fuel oil upon separation of the liquids from the gas.

It is seen that the process of this invention provides versatility for selecting the composite proportion of liquid and gaseous hydrocarbon fuels produced from peat. Presently known single stage fluidized bed processes utilizing deep bed injection or single stage entrained flow processes such as the Koppers-Totzek process, produce little or no hydrocarbon liquid fuel. The single stage entrained flow systems produce little or no direct methane. The methane must be produced by catalytic methanation which adds additional investment and reduces the overall process thermal efficiency. Likewise, to produce satisfactory liquid fuels, the single stage entrained flow process for gasification of peat must produce all of the liquids either by Fischer-Tropsch type synthesis or methanol synthesis, again increasing the capital investment and reducing the overall process thermal efficiency.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for production of synthetic hydrocarbon fuels from peat comprising:
providing wet peat to a fluidized bed peat drier for substantial drying;
passing substantially dry peat from said fluidized bed peat drier to a hydropyrolysis zone, the mean temperature of said hydropyrolysis zone maintained at about 1000° to about 1400° F. to increase liquid hydrocarbon yield suitable for gasoline blending feedstock and fuel oil;
passing peat char from said hydropyrolysis zone to a fluidized bed char gasifier zone, introducing steam and oxygen to said char gasifier zone and maintaining a mean temperature of said char gasifier zone of above about 1700° F. and below the sintering temperature of the char, the gases from said char gasifier zone passing directly to said hydropyrolysis zone; and
passing gases and contained vapors from said hydropyrolysis zone through said peat drier providing fluidization for said fluidized bed peat drier and then removing said gases and contained vapors for separation of liquid and gaseous hydrocarbon synthetic fuels.

2. The process of claim 1 wherein about 5 to about 25 weight percent wet peat, based upon total peat, is provided to the bottom of said hydropyrolysis zone which is maintained at a temperature of about 1100° to about 1200° F. to increase hydrocarbon liquid yield suitable for gasoline blending feedstock and fuel oil.

3. The process of claim 2 wherein about 7 to about 15 weight percent wet peat is provided to the bottom of said hydropyrolysis zone.

4. The process of claim 2 wherein said char gasifier zone is maintained at a temperature of about 1700° to about 1900° F.

5. The process of claim 1 wherein said removed gases and contained vapors are separated to liquids comprising gasoline blending feedstock and fuel oil and to medium Btu gases which following $CO_2$ and S removal are suitable for use as medium Btu gaseous fuel.

6. The process of claim 5 wherein at least a portion of said medium Btu gases are subject to Fischer-Tropsch synthesis producing liquids comprising gasoline, fuel oil and liquid hydrocarbons and medium Btu gases.

7. The process of claim 5 wherein at least a portion of said medium Btu gases are subject to methanol synthesis producing methanol and medium Btu gases.

8. The process of claim 7 wherein at least a portion of said methanol is subject to gasoline production.

9. The process of claim 5 wherein at least a portion of said medium Btu gases are methanated to produce synthetic natural gas.

10. The process of claim 6 wherein at least a portion of the produced medium Btu gases are methanated to produce synthetic natural gas.

11. The process of claim 7 wherein at least a portion of the produced medium Btu gases are methanated to produce synthetic natural gas.

12. The process of claim 1 wherein the total pressure in said fluidized bed char gasifier zone, hydropyrolysis zone and fluidized bed peat drier is about 200 to about 600 psia.

13. The process of claim 12 wherein the total pressure in said fluidized bed char gasifier zone, hydropyrolysis zone and fluidized bed peat drier is about 450 to about 550 psia.

14. The process of claim 12 wherein the hydrogen partial pressure in the hydropyrolysis zone is about 60 to about 150 psia.

15. The process of claim 13 wherein the hydrogen partial pressure in the hydropyrolysis zone is about 80 to about 120 psia.

16. The process of claim 1 wherein the peat char is passed directly from the hydropyrolysis zone to the fluidized bed char gasifier zone while maintaining its elevated temperature.

17. The process of claim 1 wherein the char residence time in said char gasifier zone is about 15 to about 30 minutes.

18. The process of claim 1 wherein said hydropyrolysis zone is a cocurrent dilute phase hydropyrolysis zone.

19. The process of claim 18 wherein the residence time in said cocurrent dilute phase hydropyrolysis zone is about 2 to about 10 seconds.

20. The process of claim 1 wherein said hydropyrolysis zone is a fluidized bed.

21. The process of claim 20 wherein the gas residence time in said fluidized bed hydropyrolysis zone is about 2 to about 10 seconds and the solids residence time in said fluidized bed hydropyrolysis zone is up to about 10 minutes.

22. The process of claim 20 wherein about 5 to about 25 weight percent wet peat, based upon total peat, is provided to the bottom of said hydropyrolysis zone which is maintained at a temperature of about 1100° to about 1200° F. to increase hydrocarbon liquid yield suitable for gasoline blending feedstock and fuel oil.

23. The process of claim 22 wherein about 7 to about 15 weight percent wet peat is provided to the bottom of said hydropyrolysis zone.

24. The process of claim 20 wherein said char gasifier zone is maintained at a temperature of about 1700° to about 1900° F.

25. The process of claim 20 wherein said removed gases and contained vapors are separated to liquids comprising gasoline blending feedstock and fuel oil and to medium Btu gases which following $CO_2$ and S removal are suitable for use as medium Btu gaseous fuel.

26. The process of claim 25 wherein at least a portion of said medium Btu gases are subject to Fischer-Tropsch synthesis producing liquids comprising gasoline, fuel oil and liquid hydrocarbons and medium Btu gases.

27. The process of claim 25 wherein at least a portion of said medium Btu gases are subject to methanol synthesis producing methanol and medium Btu gases.

28. The process of claim 27 where at least a portion of said methanol is subject to gasoline production.

29. The process of claim 25 wherein at least a portion of said medium Btu gases are methanated to produce synthetic natural gas.

30. The process of claim 26 wherein at least a portion of the produced medium Btu gases are methanated to produce synthetic natural gas.

31. The process of claim 27 where at least a portion of the produced medium Btu gases are methanated to produce synthetic natural gas.

32. The process of claim 20 wherein the total pressure in said fluidized bed char gasifier zone, hydropyrolysis zone and fluidized bed peat drier is about 200 to about 600 psia.

33. The process of claim 32 wherein the total pressure in said fluidized bed char gasifier zone, hydropyrolysis zone and fluidized bed peat drier is about 450 to about 550 psia.

34. The process of claim 32 wherein the hydrogen partial pressure in the hydropyrolysis zone is about 60 to about 150 psia.

35. The process of claim 33 wherein the hydrogen partial pressure in the hydropyrolysis zone is about 80 to about 120 psia.

36. The process of claim 20 wherein the peat char is passed directly from the hydropyrolysis zone to the fluidized bed char gasifier zone while maintaining its elevated temperature.

37. The process of claim 20 wherein the char residence time in said char gasifier zone is about 15 to about 30 minutes.

38. A process for production of synthetic hydrocarbon fuels from peat comprising:
providing wet peat to a fluidized bed peat drier for substantial drying;
passing substantially dry peat from said fluidized bed peat drier to a hydropyrolysis zone, the mean temperature of said hydropyrolysis zone maintained at about 1400° to about 1600° F. to increase hydrocarbon gas production;
passing peat char from said hydropyrolysis zone directly while maintaining its elevated temperature to a fluidized bed char gasifier zone, introducing steam and oxygen to said char gasifier zone and maintaining a mean temperature of said char gasifier zone of above about 1700° F. and below the sintering temperature of the char, the gases from said char gasifier zone passing directly to said hydropyrolysis zone; and
passing gases and contained vapors from said hydropyrolysis zone through said peat drier providing fluidization for said fluidized bed peat drier; and separating said gases and contained vapors, said contained vapors directly forming liquids comprising gasoline blending feedstock and fuel oil and methanating said gases following $CO_2$ and S removal to produce synthetic natural gas.

39. The process of claim 38 wherein said hydropyrolysis zone is maintained at about 1450° to about 1550° F.

40. The process of claim 38 wherein said hydropyrolysis zone comprises a fluidized bed.

* * * * *